United States Patent
Babbar (10) Patent No.: US 8,599,720 B2
(45) Date of Patent: Dec. 3, 2013

(54) OPTIMIZED RESOURCE USAGE WITH NETWORK INITIATED QOS

(75) Inventor: Uppinder S. Babbar, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 347 days.

(21) Appl. No.: 12/823,757

(22) Filed: Jun. 25, 2010

(65) Prior Publication Data

US 2011/0170453 A1 Jul. 14, 2011

Related U.S. Application Data

(60) Provisional application No. 61/220,991, filed on Jun. 26, 2009.

(51) Int. Cl.
*H04L 12/54* (2013.01)

(52) U.S. Cl.
USPC ............................................. 370/254

(58) Field of Classification Search
CPC .................................. H04L 12/5695
USPC .................. 370/229–237, 254, 437
See application file for complete search history.

(56) References Cited

U.S. PATENT DOCUMENTS

| 7,558,283 B2* | 7/2009 | Zheng ........................... 370/437 |
| 7,643,411 B2* | 1/2010 | Andreasen et al. ........... 370/229 |
| 2006/0029096 A1 | 2/2006 | Babbar et al. |
| 2007/0266430 A1 | 11/2007 | Babbar et al. |
| 2009/0067372 A1 | 3/2009 | Shah et al. |

FOREIGN PATENT DOCUMENTS

| GB | 2386282 | 9/2003 |
| WO | WO2008038231 | 4/2008 |
| WO | 2009032952 A1 | 3/2009 |

OTHER PUBLICATIONS

"3rd Generation Partnership Project; Technical Specification Group Services and Architecture; Optimisations and Enhancements for Realtime IMS communication; (Release 7)" 3rd Generation Partnership Project (3GPP); Technical Report (TR), XX, XX, vol. 23.818, No. V0.5.0, Jul. 19, 2006, pp. 1-57, XP002414868.
Digital cellular telecommunications system (Phase 2+); Universal Mobile Telecommunications System (UMTS); General Packet Radio Service (GPRS); Service description; Stage 2 (3GPP TS 23.060 version 7.6.0 Release 7); ETSI TS 123 060 ETSI Standards, LIS, Sophia Antipolis Cedex, France, vol. 3-SA2, No. V7.6.0, Jan. 1, 2008, XP014040555 ISSN: 0000-0001.
Ericsson: "Operator Controlled QoS" 3GPP TSG SA WG2, XX, XX, No. S2-060049, Jan. 16, 2006, p. 5PP, XP007901697.
International Search Report and Written Opinion—PCT/US2010/040114, International Search Authority—European Patent Office—Oct. 19, 2010.
Ludwig R, et al., "An evolved 3GPP QoS concept" Internet Citation May 10, 2006, pp. 388-392, XP002482553 Retrieved from the Internet: URL:http://ieeexplore.ieee.org/iel5/11096/35441 101 682842.pdf?tp=&isnumber=&arnumber=l682842 [retrieved on Jun. 21, 2008.
Qualcomm Europe: "UE Initiated QoS in LTE/SAE", 3GPP RAN WG2 Meeting AH on LTE, 3GPP, R2-061840, pp. 4, Jun. 30, 2006.
Taiwan Search Report—TW099121152—TIPO—Jul. 5, 2013.

* cited by examiner

*Primary Examiner* — Ricky Ngo
*Assistant Examiner* — Ben H Liu
(74) *Attorney, Agent, or Firm* — François A. Pelaez (57) ABSTRACT

A Quality of Service (QoS) interface maps virtual-to-real QoS instances and vice versa in order to make transparent to a network and to user equipment when network-initiated QoS is not supported by both.

52 Claims, 6 Drawing Sheets

OPTIMIZED RESOURCE USAGE WITH NETWORK INITIATED QOS

CLAIM OF PRIORITY UNDER 35 U.S.C. §119

The present Application for patent claims benefit of Provisional Application Ser. No. 61/220,991 filed Jun. 26, 2009 and assigned to the assignee hereof and hereby expressly incorporated by reference herein.

BACKGROUND

1. Field

The present disclosure relates generally to communication, and more specifically, to techniques for implementing device-initiated and network-initiated Quality of Service (QoS) in a wireless communication network.

2. Background

Traditionally Quality of Service (QoS) is requested by a device requiring special treatment for the traffic it sends or receives. Recently, most predominant wireless standards (3GPP (UMTS Rel 8, LTE etc.), 3GPP2 (eHRPD), IEEE (WiMax) etc.) have added the capability of network initiated QoS where QoS is automatically provisioned by the network for a device based on services that device is expected to provide to its users. Network monitors the signaling messages and other user traffic sent/received by the device and automatically configures/modifies QoS for the device. In the long term, such automatic scheme is intended to have better control for network operators to manage precious network resources. In the short term, it poses several issues and challenges related to migration wherein a population of user equipment includes devices provisioned for the innovation and those that are not.

For example, it is desirable that redundant resources are addressed, avoiding resource over allocation during presence of both device and network initiated QoS. If a device requests the QoS for the same service for which it has already been provisioned by the network, there will be double resource allocation in the network than necessary.

For another example, it is desirable that degraded performance be prevented. Most legacy QoS applications are written assuming UE initiated QoS. These applications running specific behavior from the network for various QoS operations. For example, if a QoS request is denied, the application may fail to continue and throw an error to the user resulting in service availability. Alternatively, an application may decide to continue assuming best effort service but may degrade the quality to adjust to having no specific resource guarantee even though resources are reserved for this application.

For an additional example, it is desirable that roaming be addressed. Applications written to take advantage of new capability of network initiated QoS may not function well when they roam to the networks where such capability is not available.

SUMMARY

In an aspect of the disclosure, a method for coordinating Quality of Service (QoS) performance between a device and a network is provided. The method generally includes receiving a request, initiated at the device, for device-initiated QoS, matching the request with a real QoS instance configured by the network, creating a virtual QoS instance, binding the virtual QoS instance to the real QoS instance, and communicating with the network device using the virtual QoS instance.

In an aspect of the disclosure, a computer-program product for coordinating Quality of Service (QoS) performance between a device and a network is provided. The computer-program product generally includes a computer-readable medium comprising code for receiving a request, initiated at the device, for device-initiated QoS, matching the request with a real QoS instance configured by the network, creating a virtual QoS instance, binding the virtual QoS instance to the real QoS instance, and communicating with the network device using the virtual QoS instance.

Figure 5:
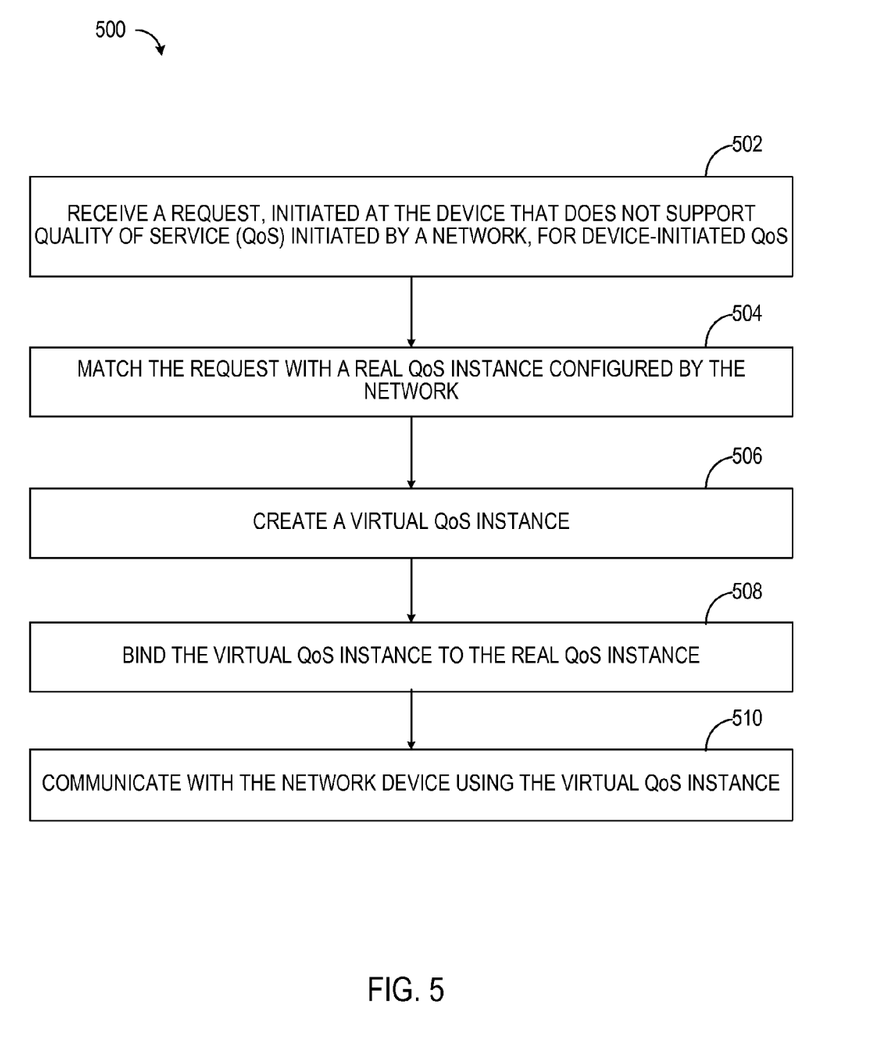
FIG. 5 illustrates example operations for coordinating QoS between user equipment and a network in a wireless communication system.
Figure 5A:
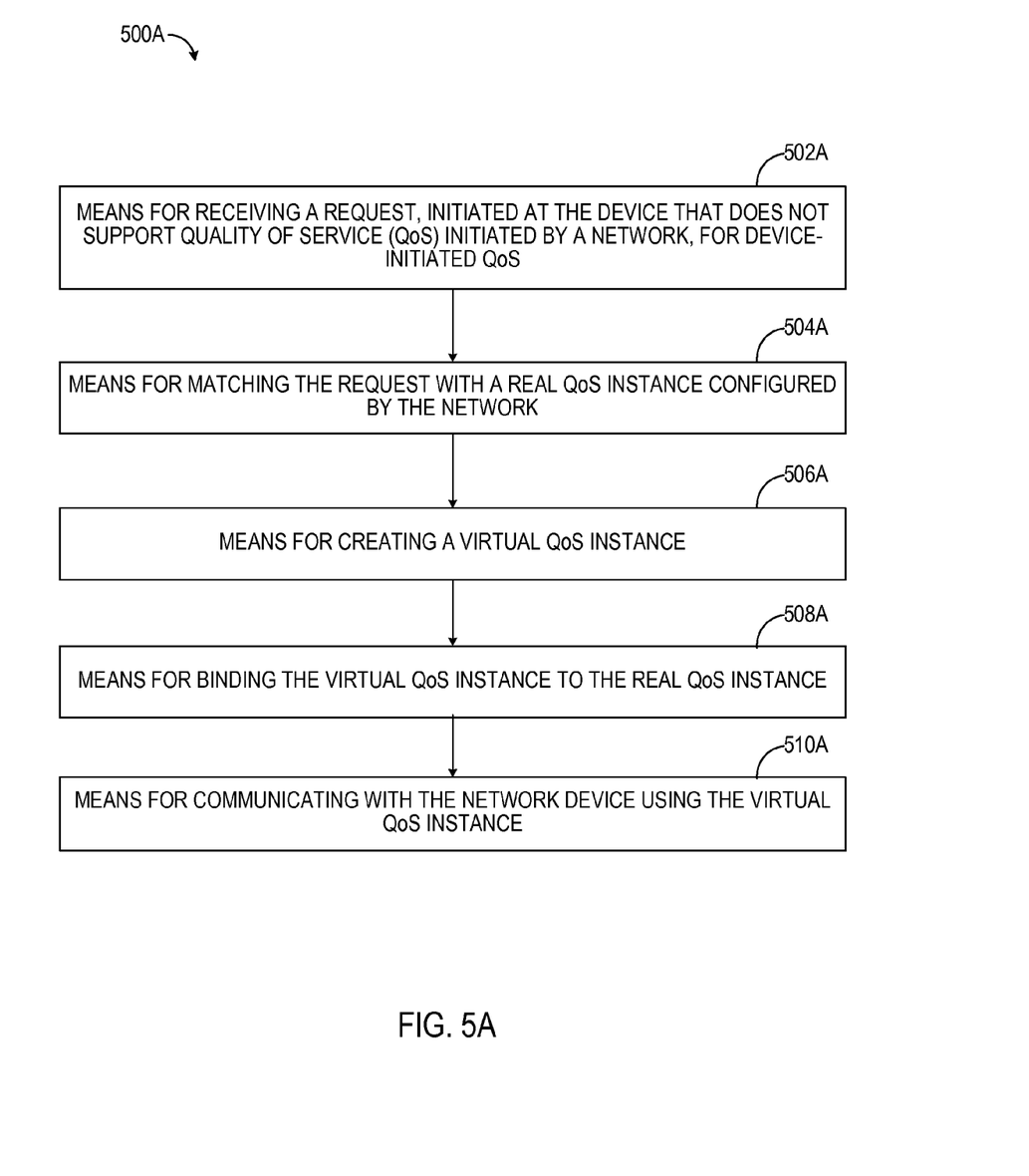
FIG. 5A illustrates an example apparatus for coordinating QoS with a network in a wireless communication system in accordance with an aspect of the present disclosure.

In an aspect of the disclosure, referring to FIG. 5A, an apparatus (Block 500A) for coordinating Quality of Service (QoS) performance between a device and a network is provided. The apparatus generally includes means for receiving a request, initiated at the device, for device-initiated QoS (Block 502A), means for matching the request with a real QoS instance configured by the network (Block 504A), means for creating a virtual QoS instance (Block 506A), means for binding the virtual QoS instance to the real QoS instance (Block 508A), and means for communicating with the network device using the virtual QoS instance (Block 510A).

In an aspect of the disclosure, an apparatus for coordinating Quality of Service (QoS) performance between a device and a network is provided. The apparatus generally includes at least one processor configured to receive a request, initiated at the device, for device-initiated QoS, match the request with a real QoS instance configured by the network, create a virtual QoS instance, bind the virtual QoS instance to the real QoS instance, and communicate with the network device using the virtual QoS instance; and a memory coupled to the at least one processor.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

An Example Wireless Network

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). Cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). Cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Figure 1:
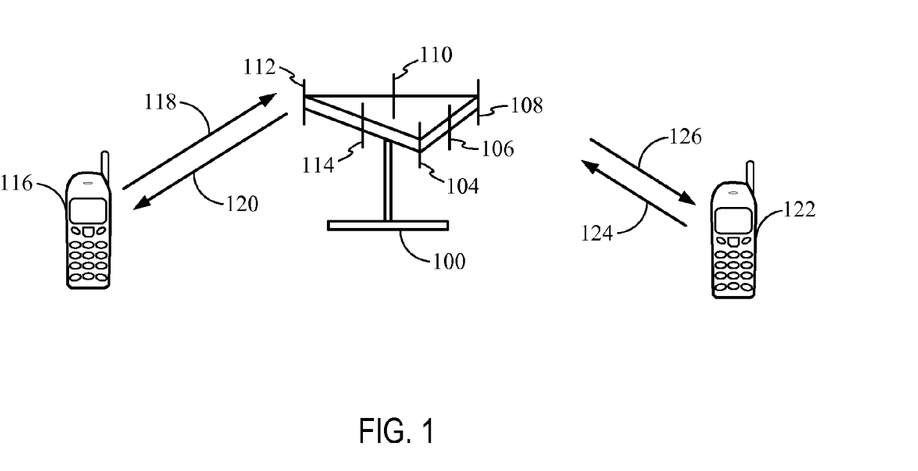
FIG. 1 illustrates an example multiple access wireless communication system in accordance with certain aspects of the present disclosure.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector, of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 2:
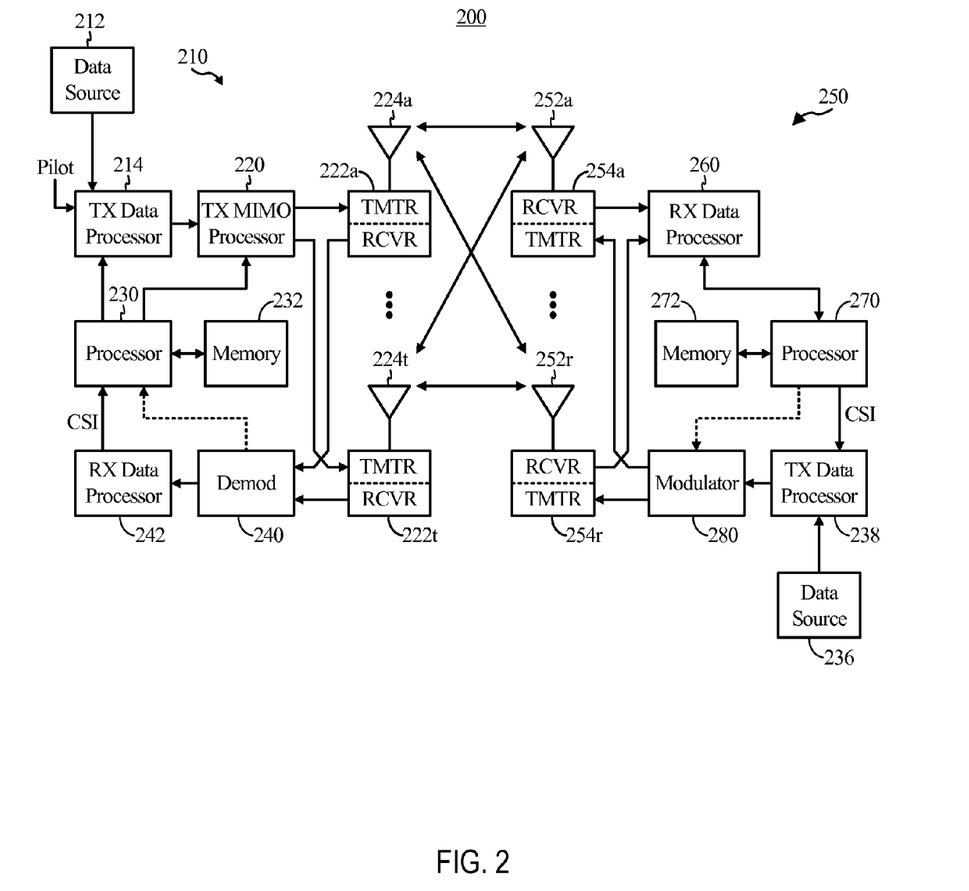
FIG. 2 illustrates a block diagram of an access point and a user terminal in accordance with certain aspects of the present disclosure.

FIG. 2 is a block diagram of an embodiment of a transmitter system 210 (also known as the access point) and a receiver system 250 (also known as access terminal) in a MIMO system 200. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240 and processed by a RX data processor 242 to extract the reserve link message transmitted by the receiver system 250. Processor 230 then determines which pre-coding matrix to use for determining the beamforming weights then processes the extracted message.

Example QoS Coordination

A wireless communication system may support network-initiated Quality of Service (QoS) wherein a network entity selectively enables a population of user equipment (UE) to perform device-initiated QoS, depending upon their configuration for responding to network initiated QoS or relying upon device-initiated QoS. According to certain aspects of the present disclosure, QoS coordination involving mapping of operations between a virtual QoS instance and a real QoS may help enable accommodate the various combinations of such devices.

Figure 3:
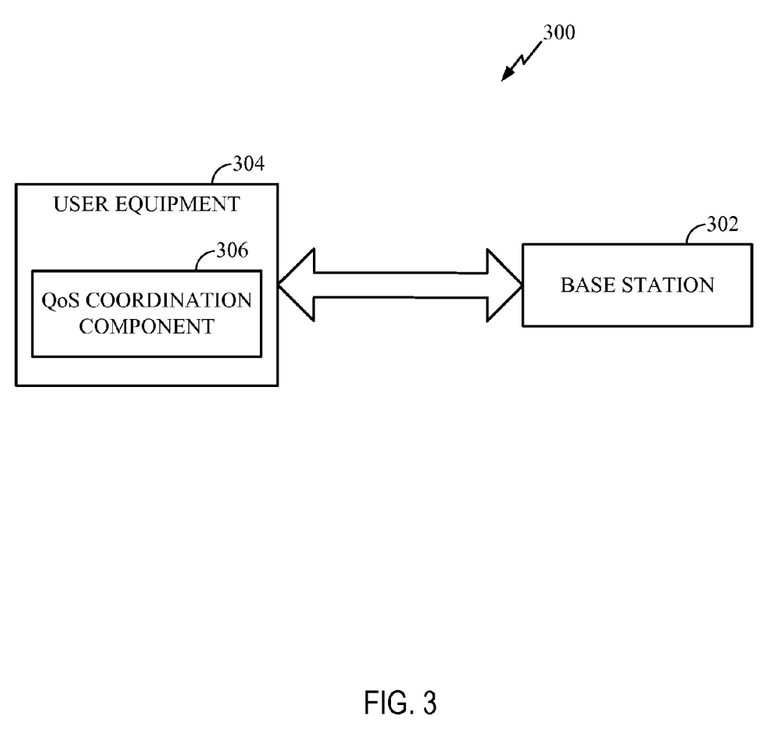
FIG. 3 illustrates a block diagram of an example system with coordinated QoS in accordance with certain aspects of the present disclosure.

FIG. 3 illustrates an example system 300 that may implement QoS coordination in accordance with certain aspects of the present disclosure.

The system 300 includes a base station 302 (e.g., access point, Node B, eNode B, etc.) that can communicate with user equipment 304 (e.g., mobile station, mobile device, and/or any number of disparate devices (not shown)). The base station 302 can transmit information to the user equipment 304 over a forward link channel or downlink channel; further, base station 302 can receive information from the user equipment 304 over a reverse link channel or uplink channel. Moreover, system 300 can be a MIMO system. Additionally, the system 300 can operate in an OFDMA wireless network (e.g., 3GPP, 3GPP2, 3GPP LTE . . . ), among others. Also, the components and functionalities shown and described below in the base station 302 can be present in the user equipment 304 and vice versa, in one example.

The user equipment 304 may include a QoS coordination component 306. In accordance with one embodiment, the QoS coordination component 306 may enable UEs (or other devices) that do not support network-initiated QoS to communicate with networks that do. The QoS coordination component 306 may perform operations described in greater detail below, with reference to FIGS. 4 and 5.

Figure 4:
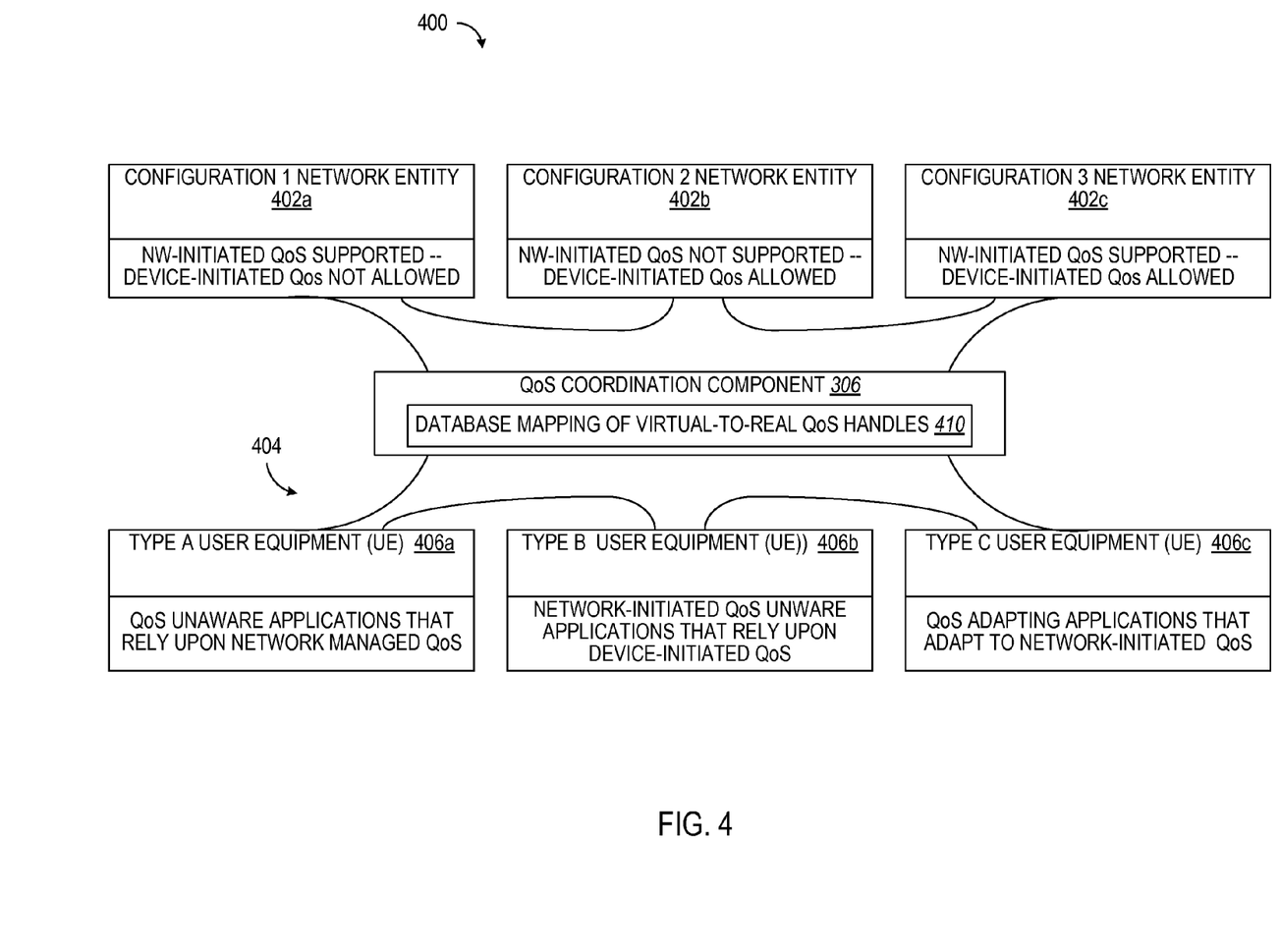
FIG. 4 depicts a block diagram of a wireless communication system wherein an interface entity enables networks to user equipment that can provide differing support for device and network-initiated Quality of Service (QoS).

As illustrated in FIG. 4, a wireless communication network 400 may comprise network entities (e.g., a base node) with varying capability to support network-initiated QoS and device-initiated QoS. A Configuration 1 network entity 402a supports network-initiated QoS but device-initiated QoS is not allowed. Configuration 2 network entity 402b does not support network-initiated QoS but device-initiated QoS is allowed. Configuration 3 network entity 402c supports network-initiated QoS and device-initiated QoS is allowed.

These network entities 402a-402c serve a population 404 of user equipment (UE) 406a-406c that implement application that can be categorized by how they handle QoS. Type A UE 406a has QoS unaware applications, relying completely on network to manage QoS. Type B UE 406b has legacy QoS applications that are not aware of any network-initiated QoS but rather rely upon device-initiated QoS. Type C UE 106b has adapting applications that adapts to the network capability when available. A QoS coordination component 306, which may be any suitable logic (hardware, software, and/or firmware), may provides a mapping 410 of virtual to real QoS instances and vice versa ("database mapping of virtual-to-real QoS handles").

Type A QoS applications generally refer to applications that rely on the network to manage their QoS. Such applications may get appropriate QoS in Configuration 1 and Configuration 3 but not in Configuration 2. Either way, these applications are likely written to not make any assumptions on QoS availability and will continue to function in any Configuration.

Thus, the QoS coordination component 306 may not be needed by Type A QoS applications. However, the QoS coordination component 306 may help optimize network resources and user behavior for Type B and C applications.

FIG. 5 illustrates example operations 500 that may be performed, for example, at a user equipment (UE) by QoS coordination component 306.

The operations begin, at 502, with receipt of a request, initiated at the device, for device-initiated QoS (e.g., a QoS request from an application running on the device). At 504, the request is matched with a real QoS instance configured by the network and, at 506, a virtual QoS instance is created. At 508, the virtual QoS instance is bound to the real QoS instance and, at 510, the UE communicates with the network device using the virtual QoS instance. Exactly how the matching is performed may depend on the type of application issuing the request.

As an example, Type B QoS Applications generally refer to applications that initiate requests for QoS and expect a positive response to function optimally. When a device capable of supporting Network-initiated QoS receives such a request from Application Type B, it typically attempts to match this request with any existing QoS instances in the device. These QoS instances may have been automatically configured by the network.

The matching is typically performed by comparing a set of Traffic Filter Templates (TFTs), specified by the application as part of its QoS request, with the TFTs associated with configured QoS instances in the device. TFTs generally refer to a set of parameters from a packet header field and may include parameters, such as IP address, port numbers, protocol types, and the like. It should be noted that the TFT comparison may not result in exact match and it may be left as a decision for each specific implementation whether an already configured QoS is capable of meeting the requirements of a QoS request initiated by a Type B application.

If a match is found, the device will create a "virtual" QoS instance/object (Qv) and binds it to the actual/real QoS instance (Qr) setup by the network. Of course, the network will be completely unaware of the virtual QoS instance. In other words, from the application-perspective, it has initiated the QoS although the actual QoS is owned by the network. In this example, any QoS operation performed by the application is actually performed on the virtual QoS instance and then mapped to the bound QoS instance. Mapping an operation from a virtual QoS instance to an actual Network initiated QoS instance may require some translation which may be performed by the device.

This translation depends upon various factors, such as network capabilities and the operations a device is authorized to perform on a Network initiated QoS in a given network. For example, certain networks may allow s device to alter (e.g., modify, suspend, and/or resume) network-initiated QoS, but only the network can create and delete the QoS. On the other hand, other networks may not allow a device to perform any operation on the network initiate QoS.

Tables 1 and 2, below, provide example translation mappings of example operations from virtual QoS instances to real QoS instances and vice-versa. The operations listed below are examples only of operations that may be implemented by QoS enabled devices. Those skilled in the art will appreciate that the list is exemplary only and can be extended to other operations and implementations, using the basic framework of coordinated QoS described herein.

Table 1 illustrates mappings for Configuration 1, where Network initiated QoS is supported, but device initiated QoS is not allowed by the network. In this example, however, it is assumed that the Network allows the device to suspend/resume/modify network initiated QoS, but that QoS setup/release is controlled by the network alone.

TABLE 1

| Operation | Action on Virtual QoS object (Qv) | Action on Real QoS object (Qr) | Network Interaction | Comments |
|---|---|---|---|---|
| New QoS Request | Create a virtual QoS object Qv1. Match Qv1 with existing real QoS objects {Qr} to see if there is a match. If match found (say Qr1), bind newly created Qv1 to Qr1 and match the state of Qv1 to align with Qr1 (On, suspend etc.). If a match is not found, add Qv1 to {Qv-pending} for later binding. | Add a reverse binding in Qr1 to Qv1. | Request a QoS modification on Qr1 if Qv1 > Qr1. Modify request may succeed or fail depending on the network conditions, policy and resource availability. | When a match is not found, an implementation may either queue the request or fail it right away (failure notification to app). If it enqueues it, it can mark Qv1 as "pending." Any operation, other than release, performed on the pending QoS object by the application should be failed. When a match is found, Qv1 state should align with Qr1 state and application should be notified appropriately based on that state - success/suspend/pending etc. Also indicate to the app, type of QoS provided (=Qr1) and may be different from Qv1 based on modification results. |
| QoS Release | Unbind Qv1 from corresponding Qr1, if binding exists. Release Qv1. | Unbind Qr1 from corresponding Qv1, if binding exists. | Modify QoS to restore Qr1 to original form, if applicable. | Provide release notification to application. |
| Suspend QoS | Change Qv1 state to "suspend" if operation on Qr1 is successful. | Change Qr1 state to "suspend" if operation is successful. | Perform suspend operation on Qr1. | Provide suspend notification to application if operation successful. |
| Resume QoS | Change Qv1 state to "On" if operation on Qr1 is successful. | If Qr1 is in "suspend" state, change Qr1 state to "On" if operation is successful. | Perform resume operation on Qr1, if it is in "suspend" state. | Provide resume notification to application if operation successful. |
| Modify QoS | Modify Qv1 if operation on Qr1 is successful. | Modify Qr1 if operation is successful. | Perform modify operation on Qr1. | Notify application of modified QoS if successful. Additionally, if Qr1 modification does not succeed due to network policy, device can look for another available real QoS instance to match modified Qv1, if available. In that case, Qv1 should be remapped to new QoS, Qr2. |

TABLE 1-continued

| Operation | Action on Virtual QoS object (Qv) | Action on Real QoS object (Qr) | Network Interaction | Comments |
| --- | --- | --- | --- | --- |
| Network initiated QoS Setup | Match newly setup QoS Qr2 with a pending virtual QoS {Qv-pending} to find a match. If a match is found (say Qv2), bind Qv2 to Qr2. | Add a reverse binding from Qr2 to Qv2, if a match is found. | Complete steps to setup network initiated QoS Qr2. | As an optimization, device can also try to match Qr2 with all the existing virtual QoS {Qv}. If Qr2 matches a virtual QoS Qv3, which is already bound to another existing QoS Qr3, an analysis is performed to see if Qv3 has a better fit with Qr2 (i.e., it meets Qv3 requirements more closely to provide better service). If it does, binding of Qv3 is updated to map to Qr2 and application can be notified with updated QoS if applicable. |
| Network Initiated QoS release | Get bound virtual QoS (Qv2) that is bound to Qr2 (if available), add Qv2 to the pending set and notify application of QoS temporarily unavailable. | Delete Qr2. | Complete steps to release network initiated QoS Qr2. | A simpler implementation may delete Qv4 and indicate failure to the app. Application can re-request QoS if needed. |
| Network initiated suspend | Get bound virtual QoS (Qv2) that is bound to Qr2 (if available). move to suspend state and notify app. | Move Qr2 to suspend. | Complete steps to suspend network initiated QoS Qr2. | |
| Network initiated resume | Get bound virtual QoS (Qv2) that is bound to Qr2 (if available), move to resume state and notify app. | Move Qr2 to resume. | Complete steps to resume network initiated QoS Qr2. | |
| Network initiated Modify | Get bound virtual QoS (Qv1) that is bound to Qr1 (if available), device analyses if Qv1 still matches the modified QoS, Qr1. If it does, indicate the new QoS to the app. Otherwise, add Qv1 to pending set and notify application of QoS temporarily unavailable. Run a match of new Qr1 to on pending QoS set {Qv-pending} to see if another QoS instance matches new | Update binding of Qr1 appropriately. | Complete steps to modify network initiated QoS Qr1. | A simpler implementation may delete Qv1 and indicate failure to the app. |

TABLE 1-continued

| Operation | Action on Virtual QoS object (Qv) | Action on Real QoS object (Qr) | Network Interaction | Comments |
|---|---|---|---|---|
| | Qr1 (say Qv2). If it does, notify the other application using Qv2 about QoS availability. | | | |

The example mappings in Table 2 assume that the Network does not allow the device to perform any operation on network initiated QoS and all QoS management is performed by the network.

TABLE 2

| Operation | Action on Virtual QoS object (Qv) | Action on Real QoS object (Qr) | Network Interaction | Comments |
|---|---|---|---|---|
| New QoS Request | Create a virtual QoS object Qv1. Match Qv1 with existing real QoS objects {Qr} to see if there is a match. If match found (say Qr1), bind newly created Qv1 to Qr1 and match the state of Qv1 to align with Qr1 (On, suspend etc.). If a match is not found, add Qv1 to {Qv-pending} for later binding. | Add a reverse binding in Qr1 to Qv1. | None | When a match is not found, an implementation may either queue the request or fail it right away (failure notification to app). If it enqueues it, it can mark Qv1 as "pending". Any operation, other than release, performed on the pending QoS object by the application should be failed. When a match is found, Qv1 state should align with Qr1 state and application should be notified appropriately based on that state - success/suspend/pending etc. Also indicate to the application, type of QoS provided (=Qr1) which may be different from Qv1 (requested QoS) depending upon how fit the match is. |
| QoS Release | Unbind Qv1 from corresponding Qr1, if binding exists. Release Qv1. | Unbind Qr1 from corresponding Qv1, if binding exists. | None | Provide release notification to application. |
| Suspend QoS | Change Qv1 state to "suspend". | None | None | Provide suspend notification to app. Device data transmission will assume QoS is suspended, even though still available from network perspective. Network transmissions will continue to use QoS. |
| Resume QoS | Change Qv1 state to "On" only if Qr1 state is "On", otherwise indicate failure to app. | None | None | Provide resume notification to application if Qr1 is "On". |
| Modify QoS | Create a new virtual QoS object Qv2 with the new QoS parameters. | Update binding of Qr1 and Qr2 appropriately if operation is successful. | None | If a success is not found, a simpler implementation may delete the Qv2 right away and indicate failure to the app. If Qv2 is |

TABLE 2-continued

| Operation | Action on Virtual QoS object (Qv) | Action on Real QoS object (Qr) | Network Interaction | Comments |
|---|---|---|---|---|
| | Perform a match of Qv2 with existing real QoS objects {Qr}. If a match is found (say Qr2), delete Qv1, bind Qv2 to Qr2 and indicate success to the app. If a match is not found, add Qv2 to pending set while allowing the application to use Qv1 with existing QoS Qr1. | | | added to pending set, later when a new QoS Qr3 is setup by the network that matches Qv2, it can be bound to Qr3 and Qv1 can be deleted at that time. |
| Network initiated QoS Setup | Match newly setup QoS Qr2 with a pending virtual QoS {Qv-pending} to find a match. If a match is found (say Qv2), bind Qv2 to Qr2. | Add a reverse binding from Qr2 to Qv2, if a match is found. | Complete steps to setup network initiated QoS Qr2. | As an optimization, device can also try to match Qr2 with all the existing virtual QoS {Qv}. If Qr2 matches a virtual QoS Qv3, which is already bound to another existing QoS Qa3, an analysis is performed to see if Qv3 has a better fit with Qr2 (i.e. it meets Qv3 requirements more closely to provide better service). If it does, binding of Qv3 is updated to map to Qr2 and application can be notified with updated QoS if applicable. Additionally, if Qv2 is an alternative QoS request queued as part of modify operation by an application using another virtual QoS (Qv1), Qv1 should now be deleted and application should be notified to start using Qv2. |
| Network Initiated QoS release | Find virtual QoS bound to Qr2 if available (say Qv2), add Qv2 to the pending set and notify application of QoS temporarily unavailable. | Delete Qr2. | Complete steps to release network initiated QoS Qr2. | A simpler implementation may delete Qv4 and indicate failure to the app. Application can re-request QoS if needed. |
| Network initiated suspend | Find virtual QoS bound to Qr2 if available (say Qv2), move to suspend state and notify app. | Move Qr2 to suspend. | Complete steps to suspend network initiated QoS Qr2. | |
| Network initiated resume | Find virtual QoS bound to Qr2 if available (say Qv2), move to resume state and notify app. | Move Qr2 to resume. | Complete steps to resume network initiated QoS Qr2. | |

TABLE 2-continued

| Operation | Action on Virtual QoS object (Qv) | Action on Real QoS object (Qr) | Network Interaction | Comments |
|---|---|---|---|---|
| Network initiated Modify | Find virtual QoS bound to Qr1 if available (say Qv1), device analyses if Qv1 still matches the modified QoS, Qr1. If it does, indicate the new QoS to the app. Otherwise, add Qv1 to pending set and notify application of temporarily unavailable QoS. Run a match of new Qr1 to on pending QoS set {Qv-pending} to see if another QoS instance matches new Qr1. If it does, notify the other application using Qv2 about QoS availability. | Update binding of Qr1 appropriately. | Complete steps to modify network initiated QoS Qr1. | A simpler implementation may delete Qv1 and indicate failure to the app. |

As noted above, other combinations of allowed operations are possible and those cases can be solved using the proposed overall framework.

For Configuration 2, it is assumed that Network initiated QoS not supported by the device, but device initiated QoS is allowed by the network. In this case, current applications/implementations will typically continue to work without any impact.

For Configuration 3, it is assumed that Network initiated QoS is supported by the device and that device initiated QoS is allowed by the network. This case may be handed in the same (or at least similar) manner as Configuration 1, possibly with additional processing to support device initiated QoS.

When an application requests a new QoS, the device tries to match it with one or more existing network initiated QoS objects. If a match is not found, the QoS is requested from the network as device initiated QoS (e.g., using the same or similar procedures as deployed today). From that point onwards, this QoS may be treated as device initiated QoS and the device may be allowed to perform all the operations as it does in conventional implementations.

On the other hand, if a match is found, the QoS may be treated as network initiated QoS and procedures described above with reference to Configuration 1 may be used for such QoS instances. In order to differentiate between these types of QoS originated from the device, the device may create another set of QoS objects for the device initiated QoS, say {Qd}. The following labels may be used for different types of QoS:

Qv—QoS requested by the device but mapped or pending a map to network initiated QoS Qr (if pending, referred to as Qv-pending);

Qr—network initiated QoS;

Qd—device initiated QoS (not mapped to any network initiated QoS).

In Configuration 3, a Qv-pending may always be null since any QoS objects that remain unmapped may be requested as Device initiated QoS. In the scenarios described above with reference to Configuration 1, whenever a virtual QoS moves from {Qv} to {Qv-pending}, under Configuration 3, rather than move from Qv to Qv-pending, these QoS objects will actually move to {Qd} and become device initiated QoS from that point onwards.

In this scenario, a race condition may occur where the network and a device attempts to setup QoS for same services (matching TFTs) at the same time. Under this condition, QoS requests initiated by the device or network may cross each other. In this case, according to certain aspects, the network may reject the device initiated QoS. The device, in this case, may indicate a failure to the app.

If the application continues to function without QoS, it may still obtain some resources unknowingly. As an alternative, the application may decide to request QoS again. In this case, it may eventually get matched with corresponding network initiated QoS. Some networks may provide a reason for failure of a device initiated QoS request (such as "QoS already setup by network"). If such an error is known to the device, it may avoid this case by doing another match with network initiated QoS, in response to the QoS failure. If a match is found, a QoS object may be moved from Qd to Qv and binding is created from Qv to Qr. As another alternative, the device may always run this match again on all device initiated QoS failures, in an effort, to ensure best service behavior.

With the provisions described above, duplicate (redundant) QoS setup operations may be avoided. Such duplication may only occur in relatively rare cases, where both the network and device performs a successful TFT match for the same flow. This may happen, for example, because TFT parameters used by the application and networks are completely disjoint but still point to the same flow or service.

Type C QoS Applications generally refer to applications that monitor network capabilities and switch their personality to either Type A or Type B, for example, depending upon the Configuration (e.g., 1, 2 or 3). Either way, these applications will ultimately behave as either Type A or B Applications, and can be handled as described above.

The techniques described above for QoS Matching generally rely on matching 2 or more QoS objects. However, specific details of actual matching algorithms may be implementation-dependent and, ultimately determined by various considerations. QoS objects typically consist of a set of filters (e.g., t1, t2, t3, ...) TFT and a set of flow parameters (f1, f2, f3 ...) called flow specifications, typically in order of preferences. Filters are typically active for a QoS object all the time. In other words, any packets matching any of the filters in TFT are subject to the granted QoS. On the other hand, only one of the flow specifications is actually active (granted) at any given time. All packets matching TFT obtain the granted QoS (fg), which is generally one of the requested flow parameters (e.g., fg=f1 or f2, etc.). According to certain networks, granted QoS may be other than a requested QoS, for example, granted according to:

F1<fg<f2 or f2<fg<f3,

Generally, matching of filters (TFT) is performed in an effort to ensure that QoS objects being compared are meant for the same application flow(s) or service(s). A device may also further optimize behavior by also comparing the flow specification. This may help ensure that Qv is as close as possible to Qr to provide the application with the best possible QoS. As an example, a certain Qv may matches Qr in terms of TFT, but the flow specification included in Qr may be meant for a lower performance as compared to the flow specification requested in Qv. In this case, the device can compare the flow specification between Qv and Qr and request a modify operation from the network (if allowed) to upgrade Qr to better QoS. As an alternative, in Configuration 3, the device may request to move Qv to Qd, since Qr is not sufficient for appropriate service behavior.

In general, for proper QoS coordination, only TFT matching may be performed, but for optimal results, flow specification matching should also be performed. In addition, while performing a TFT match, only a subset of filters may match. The following examples illustrated cases to be handled depending upon different scenarios. One such scenario, may be referred to as CASE A:

Qv<Qr.

In this example, Qv is a proper subset of Qr. In other words, Qr provides QoS for all flows handled by Qv, but also for other flows. In this case, the device may request to upgrade QoS since the same QoS is shared by Qv and some other flows. Another scenario may be referred to as CASE B:

Qr<Qv.

In this example, Qr is a proper subset of Qv. In other words, Qr provides QoS for some flows of Qv but not all. In this case, the device may split the QoS object into a combination of Qv and Qd objects, in an effort to provide QoS for all flows. Qd objects may be treated as device-initiated, while Qv objects may be mapped to Qr. Another scenario may be referred to as CASE C:

Qv and Qr partially overlap.

This case may be treated as a combination of CASE A and CASE B. QoS may be requested to be upgraded as in CASE A (e.g., in an effort to avoid performance degradation) and Qv may also be split as in CASE B to add some Qd objects. The simplest case may be referred to as CASE D:

Qv=Qr.

In this case, there is a match no further action may be needed. As noted, how an application handles the different cases above is implementation dependent and may affect performance of TFT matching.

Referring to FIG. 5A, an aspect of an apparatus 500A of the present disclosure includes, at Block 502A, means for receiving a request, initiated at the device that does not support quality of service (QoS) initiated by a network, for device-initiated QoS. Further, apparatus 500A includes, at Block 504A, means for matching the request with a real QoS instance configured by the network. At block 506A, apparatus 500A includes means for creating a virtual QoS instance. Moreover, at block 508A, apparatus 500A includes means for binding the virtual QoS instance to the real QoS instance. At block 510A, apparatus 500A includes means for communicating with the network device using the virtual QoS instance.

Those of skill in the art would understand that information and signals may be represented using any of a variety of different technologies and techniques. For example, data, instructions, commands, information, signals, bits, symbols and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits and algorithm steps described in connection with the aspects disclosed herein may be implemented as electronic hardware, computer software or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component," "module," "system," and the like are intended to refer to a computer-related entity, either hardware, a combination of hardware and software, software, or software in execution. For example, a component may be, but is not limited to being, a process running on a processor, a processor, an object, an executable, a thread of execution, a program and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs.

Various aspects will be presented in terms of systems that may include a number of components, modules, and the like. It is to be understood and appreciated that the various systems may include additional components, modules, etc., and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus or article of manufacture using standard programming and/or engineering techniques to produce software, firmware, hardware or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for coordinating Quality of Service (QoS) performance between a device and a network, comprising:
    receiving a request, initiated at an application residing on the device that does not support QoS initiated by the network, for device-initiated QoS;
    matching the request with a real QoS instance configured by the network based in part on a type of application issuing the request, wherein the type of application includes at least one of a first type that relies upon device-initiated QoS and is unaware of network-initiated QoS or a second type that adapts to the available network capability, wherein matching the request comprises comparing a set of traffic filter templates (TFT) specified by the device in the request;
    creating a virtual QoS instance;
    binding the virtual QoS instance to the real QoS instance; and
    communicating with the network using the virtual QoS instance.

2. The method of claim 1, further comprising:
    determining whether the network allows the device to alter network-initiated QoS;
    receiving a request, initiated at the device, to alter QoS; and
    altering the virtual QoS instance and the real Quality of Service (QoS) in response to the request to alter.

3. The method of claim 2, wherein:
    the request to alter QoS comprises a request to at least one of suspend, resume or modify QoS; and the altering comprises at least one of suspending, resuming, or modifying the virtual QoS instance and the real Quality of Service (QoS) in response to the request to alter.

4. The method of claim 1, further comprising:
determining whether the network does not allow the device to perform any operation on a network-initiated Quality of Service (QoS);
matching a second QoS request with a second real Quality of Service (QoS) instance configured by the network;
creating a second virtual QoS instance;
binding the second virtual QoS instance to the second real Quality of Service (QoS) instance; and
communicating with the network using the second virtual QoS instance.

5. The method of claim 1, further comprising:
receiving a request to modify QoS;
modifying the real QoS instance in response to the request; and
determining if the bound virtual QoS instance matches the modified QoS.

6. The method of claim 5, further comprising:
adding the modified QoS to the application if the bound virtual QoS instance matches the modified QoS.

7. The method of claim 5, further comprising:
adding the bound virtual QoS instance to a pending set; and
notifying the application that QoS is temporarily unavailable.

8. The method of claim 5, further comprising:
determining the modified QoS matches a virtual QoS instance in a pending set; and
in response, adding modified QoS to the application using the matching virtual QoS instance.

9. The method of claim 1, further comprising:
in response to a QoS failure, performing another match with network initiated QoS; and
if a match is found, binding a virtual QoS instance to a real QoS instance based on the match.

10. The method of claim 1, further comprising:
unbinding the virtual QoS instance from the Unbinding from the real QoS instance.

11. The method of claim 10, further comprising modifying the real QoS instance.

12. The method of claim 10, wherein the unbinding is in response to a network initiated release and the method further comprises:
moving the virtual QoS instance to a pending set; and
notifying the application that QoS is temporarily unavailable.

13. The method of claim 10, wherein the unbinding is in response to a network initiated release and the method further comprises:
releasing the virtual QoS instance; and
notifying the application that QoS is lost.

14. A computer-program product for coordinating Quality of Service (QoS) performance between a device and a network, the computer-program product comprising:
a non-transitory computer-readable medium comprising code for:
receiving a request, initiated at an application residing on the device that does not support QoS initiated by the network, for device-initiated QoS;
matching the request with a real QoS instance configured by the network based in part on a type of application issuing the request, wherein the type of application includes at least one of a first type that relies upon device-initiated QoS and is unaware of network-initiated QoS or a second type that adapts to the available network capability, wherein matching the request comprises comparing a set of traffic filter templates (TFT) specified by the device in the request;
creating a virtual QoS instance;
binding the virtual QoS instance to the real QoS instance; and
communicating with the network device using the virtual QoS instance.

15. The computer-program product of claim 14, further comprising code for:
determining whether the network allows the device to alter network-initiated QoS;
receiving a request, initiated at the device, to alter QoS; and
altering the virtual QoS instance and the real Quality of Service (QoS) in response to the request to alter.

16. The computer-program product of claim 15, wherein:
the request to alter QoS comprises a request to at least one of suspend, resume or modify QoS; and
the altering comprises at least one of suspending, resuming, or modifying the virtual QoS instance and the real Quality of Service (QoS) in response to the request to alter.

17. The computer-program product of claim 14, further comprising code for:
determining whether the network does not allow the device to perform any operation on a network-initiated Quality of Service (QoS);
matching a second QoS request with a second real Quality of Service (QoS) instance configured by the network;
creating a second virtual QoS instance;
binding the second virtual QoS instance to the second real Quality of Service (QoS) instance; and
communicating with the network using the second virtual QoS instance.

18. The computer-program product of claim 14, further comprising code for:
receiving a request to modify QoS;
modifying the real QoS instance in response to the request; and
determining if the bound virtual QoS instance matches the modified QoS.

19. The computer-program product of claim 18, further comprising code for:
adding the modified QoS to the application if the bound virtual QoS instance matches the modified QoS.

20. The computer-program product of claim 18, further comprising code for:
adding the bound virtual QoS instance to a pending set; and
notifying the application that QoS is temporarily unavailable.

21. The computer-program product of claim 18, further comprising code for:
determining the modified QoS matches a virtual QoS instance in a pending set; and
in response, adding modified QoS to the application using the matching virtual QoS instance.

22. The computer-program product of claim 14, further comprising code for:
in response to a QoS failure, performing another match with network initiated QoS; and
if a match is found, binding a virtual QoS instance to a real QoS instance based on the match.

23. The computer-program product of claim 14, further comprising code for:
unbinding the virtual QoS instance from the Unbinding from the real QoS instance.

24. The computer-program product of claim 23, further comprising code for modifying the real QoS instance.

25. The computer-program product of claim 23, wherein the unbinding is in response to a network initiated release and the method further comprises:
moving the virtual QoS instance to a pending set; and
notifying the application that QoS is temporarily unavailable.

26. The computer-program product of claim 23, wherein the unbinding is in response to a network initiated release and the method further comprises:
releasing the virtual QoS instance; and
notifying the application that QoS is lost.

27. An apparatus for coordinating Quality of Service (QoS) performance between a device and a network in a wireless communication system, comprising:
means for receiving a request, initiated at an application residing on the device that does not support QoS initiated by the network, for device-initiated QoS;
means for matching the request with a real QoS instance configured by the network based in part on a type of application issuing the request, wherein the type of application includes at least one of a first type that relies upon device-initiated QoS and is unaware of network-initiated QoS or a second type that adapts to the available network capability, wherein the means for matching the request comprises means for comparing a set of traffic filter templates (TFT) specified by the device in the request;
means for creating a virtual QoS instance;
means for binding the virtual QoS instance to the real QoS instance; and
means for communicating with the network device using the virtual QoS instance.

28. The apparatus of claim 27, further comprising:
means for determining whether the network allows the device to alter network-initiated QoS;
means for receiving a request, initiated at the device, to alter QoS; and
means for altering the virtual QoS instance and the real Quality of Service (QoS) in response to the request to alter.

29. The apparatus of claim 28, wherein:
the request to alter QoS comprises a request to at least one of suspend, resume or modify QoS; and
the means for altering comprises means for at least one of suspending, resuming, or modifying the virtual QoS instance and the real Quality of Service (QoS) in response to the request to alter.

30. The apparatus of claim 27, further comprising:
means for determining whether the network does not allow the device to perform any operation on a network-initiated Quality of Service (QoS);
means for matching a second QoS request with a second real Quality of Service (QoS) instance configured by the network;
means for creating a second virtual QoS instance;
means for binding the second virtual QoS instance to the second real Quality of Service (QoS) instance; and
means for communicating with the network using the second virtual QoS instance.

31. The apparatus of claim 27, further comprising:
means for receiving a request to modify QoS;
means for modifying the real QoS instance in response to the request; and
means for determining if the bound virtual QoS instance matches the modified QoS.

32. The apparatus of claim 31, further comprising:
means for adding the modified QoS to the application if the bound virtual QoS instance matches the modified QoS.

33. The apparatus of claim 31, further comprising:
means for adding the bound virtual QoS instance to a pending set; and
means for notifying the application that QoS is temporarily unavailable.

34. The apparatus of claim 31, further comprising:
means for determining the modified QoS matches a virtual QoS instance in a pending set; and
means for, in response, adding modified QoS to the application using the matching virtual QoS instance.

35. The apparatus of claim 27, further comprising:
means for, in response to a QoS failure, performing another match with network initiated QoS; and
means for, if a match is found, binding a virtual QoS instance to a real QoS instance based on the match.

36. The apparatus of claim 27, further comprising:
means for unbinding the virtual QoS instance from the Unbinding from the real QoS instance.

37. The apparatus of claim 36, further comprising means for modifying the real QoS instance.

38. The apparatus of claim 36, wherein the unbinding is in response to a network initiated release and the apparatus further comprises:
means for moving the virtual QoS instance to a pending set; and
means for notifying the application that QoS is temporarily unavailable.

39. The apparatus of claim 36, wherein the unbinding is in response to a network initiated release and the apparatus further comprises:
means for releasing the virtual QoS instance; and
means for notifying the application that QoS is lost.

40. An apparatus for coordinating Quality of Service (QoS) performance between a device and a network, comprising:
at least one processor configured to:
receive a request, initiated at an application residing on the device that does not support QoS initiated by the network, for device-initiated QoS;
match the request with a real QoS instance configured by the network based in part on a type of application issuing the request, wherein the type of application includes at least one of a first type that relies upon device-initiated QoS and is unaware of network-initiated QoS or a second type that adapts to the available network capability, wherein the at least one processor is configured to match the request by comparing a set of traffic filter templates specified by the device in the request;
create a virtual QoS instance;
bind the virtual QoS instance to the real QoS instance; and
communicate with the network device using the virtual QoS instance; and
a memory coupled to the at least one processor.

41. The apparatus of claim 40, wherein the at least one processor is further configured to:
determine whether the network allows the device to alter network-initiated QoS;
receive a request, initiated at the device, to alter QoS; and
alter the virtual QoS instance and the real Quality of Service (QoS) in response to the request to alter.

42. The apparatus of claim 41, wherein:
the request to alter QoS comprises a request to at least one of suspend, resume or modify QoS; and the at least one process is configured to at least one of suspend, resume, or modify the virtual QoS instance and the real Quality of Service (QoS) in response to the request to alter.

43. The apparatus of claim 40, wherein the at least one processor is further configured to:
   determine whether the network does not allow the device to perform any operation on a network-initiated Quality of Service (QoS);
   match a second QoS request with a second real Quality of Service (QoS) instance configured by the network;
   create a second virtual QoS instance;
   bind the second virtual QoS instance to the second real Quality of Service (QoS) instance; and
   communicate with the network using the second virtual QoS instance.

44. The apparatus of claim 40, wherein the at least one processor is further configured to:
   receive a request to modify QoS;
   modify the real QoS instance in response to the request; and
   determine if the bound virtual QoS instance matches the modified QoS.

45. The apparatus of claim 44, wherein the at least one processor is further configured to:
   add the modified QoS to the application if the bound virtual QoS instance matches the modified QoS.

46. The apparatus of claim 44, wherein the at least one processor is further configured to:
   add the bound virtual QoS instance to a pending set; and
   notify the application QoS is temporarily unavailable.

47. The apparatus of claim 44, wherein the at least one processor is further configured to:
   determine the modified QoS matches a virtual QoS instance in a pending set; and
   in response, add modified QoS to the application using the matching virtual QoS instance.

48. The apparatus of claim 40, wherein the at least one processor is further configured to:
   in response to a QoS failure, perform another match with network initiated QoS; and
   if a match is found, bind a virtual QoS instance to a real QoS instance based on the match.

49. The apparatus of claim 40, wherein the at least one processor is further configured to:
   unbind the virtual QoS instance from the Unbinding from the real QoS instance.

50. The apparatus of claim 49, wherein the at least one processor is further configured to modify the real QoS instance.

51. The apparatus of claim 49, wherein the unbinding is in response to a network initiated release and the at least one processor is further configured to:
   move the virtual QoS instance to a pending set; and
   notify the application that QoS is temporarily unavailable.

52. The apparatus of claim 49, wherein the unbinding is in response to a network initiated release and the at least one processor is further configured to:
   release the virtual QoS instance; and
   notify the application that QoS is lost.

* * * * *